(12) United States Patent
Moorjani et al.

(10) Patent No.: US 10,168,979 B2
(45) Date of Patent: Jan. 1, 2019

(54) USING A SYNC NOTIFICATION TO INDICATE WHEN A SHARED SCREEN VIEW OF A PRESENTER DEVICE HAS BEEN DELIVERED TO AN AUDIENCE

(71) Applicant: GetGo, Inc., Boston, MA (US)

(72) Inventors: Yogesh Moorjani, Goleta, CA (US); Ashish V. Thapliyal, Santa Barbara, CA (US)

(73) Assignee: GetGo, Inc., Boston, MA (US)

( * ) Notice: Subject to any disclaimer, the term of this patent is extended or adjusted under 35 U.S.C. 154(b) by 653 days.

(21) Appl. No.: 14/731,742

(22) Filed: Jun. 5, 2015

(65) Prior Publication Data

US 2016/0357495 A1    Dec. 8, 2016

(51) Int. Cl.
*G06F 3/14* (2006.01)
*G09G 5/14* (2006.01)

(52) U.S. Cl.
CPC .............. *G06F 3/1454* (2013.01); *G09G 5/14* (2013.01); *G09G 2370/022* (2013.01); *G09G 2370/04* (2013.01); *G09G 2370/10* (2013.01); *G09G 2370/16* (2013.01)

(58) Field of Classification Search
None
See application file for complete search history.

(56) References Cited

U.S. PATENT DOCUMENTS

| | | | |
|---|---|---|---|
| 2007/0261101 A1 | 11/2007 | Thapliyal et al. | |
| 2009/0265487 A1* | 10/2009 | Zhang | G06Q 10/10 710/61 |
| 2014/0019643 A1* | 1/2014 | Raju | H04L 67/32 709/248 |
| 2014/0108486 A1 | 4/2014 | Borzycki et al. | |
| 2014/0108538 A1 | 4/2014 | Borzycki et al. | |
| 2014/0108558 A1 | 4/2014 | Borzycki et al. | |
| 2014/0108599 A1 | 4/2014 | Borzycki et al. | |
| 2014/0108792 A1 | 4/2014 | Borzycki et al. | |
| 2014/0123265 A1 | 5/2014 | Borzycki et al. | |
| 2014/0184736 A1 | 7/2014 | Thapliyal et al. | |
| 2015/0066501 A1 | 3/2015 | Thapliyal | |
| 2015/0067026 A1 | 3/2015 | Christiansen et al. | |
| 2015/0142800 A1 | 5/2015 | Thapliyal | |
| 2015/0237303 A1 | 8/2015 | Thapliyal et al. | |
| 2015/0378995 A1 | 12/2015 | Brown et al. | |

\* cited by examiner

*Primary Examiner* — Esther B. Henderson
(74) *Attorney, Agent, or Firm* — BainwoodHuang (57) ABSTRACT

A technique provides a sync notification to indicate when a shared screen view of a presenter device has been delivered to an audience. The technique involves generating a sync time estimation based on communications with a set of audience devices, and detecting occurrence of an update to the shared screen view of the presenter device. The technique further involves outputting, after the sync time estimation has elapsed since the detected occurrence of the update, the sync notification on the presenter device to indicate when the shared screen view of the presenter device has been delivered to the audience. Such a technique is well suited for a variety of online collaboration systems such as online conference systems, online webinar systems, online meeting systems, and so on.

22 Claims, 6 Drawing Sheets

USING A SYNC NOTIFICATION TO INDICATE WHEN A SHARED SCREEN VIEW OF A PRESENTER DEVICE HAS BEEN DELIVERED TO AN AUDIENCE

BACKGROUND

A typical web conference involves sharing content among multiple conference participants. In particular, the conference participants are able to watch visual content (e.g., slides of a slide show, pages of a document, etc.), as well as share audio content (e.g., ask questions and inject comments) to form a collaborative exchange even though the conference participants may be scattered among remote geographical locations.

To form such a web conference, each conference participant connects a respective computerized device to a central web conference server over a computer network. The central web conference server then conveys a view of the conference organizer's computerized device (or that of the person running the conference) to those of the other conference participants. Additionally, the central web conference server shares audio among the computerized devices of the conference participants.

SUMMARY

When the above-described central web conference server conveys a new view of the conference organizer's computerized device (e.g., a next slide, a next page of a document, etc.) to those of the other conference participants, the computerized devices of the other conference participants may receive the new view at different times. Along these lines, the computerized device of a first conference participant may receive the new view relatively quickly (e.g., in a second or two) because the first conference participant has connectivity with high bandwidth and/or little competing network traffic. However, the computerized device of a second conference participant may receive the view with a significantly longer delay (e.g., after five seconds or more) because the second conference participant has connectivity with slower bandwidth and/or heavy competing network traffic.

To make sure that all conference participants have received the new view from the conference organizer's computerized device before the organizer begins discussing the new view, the organizer may ask the other conference participants if they have received the new view (e.g., "Do you see my new screen?"). The organizer may repeat this process each time the organizer updates the view.

Alternatively, the web conference may be equipped with a feature that enables the computerized device of each participant to send back an acknowledgement for each data packet or small change in the screen. In this situation, the organizer may know when all of the participants have acknowledged receipt.

Unfortunately, there are deficiencies to these above-described web conference approaches. In particular, in above-described conventional approach in which the organizer asks the members of the audience if they have received each new view, it is burdensome and distracting for the organizer to continuously ask the audience. Also, if someone in the audience says "I have not received the new screen", the organizer must then wait a few seconds and re-ask the question, until that member of the audience verbally acknowledges receipt of the new view.

Additionally, in the above-described conventional acknowledgement approach in which the organizer waits for the computerized devices of all of the other conference participants to acknowledge receipt of the each data packet or small change in the screen, the pace of the web conference may slow down dramatically. That is, each time the organizer provides any change to the audience, the organizer must wait not only for the change to reach the computerized devices of all of the conference participants, but also for all of the acknowledgements from the computerized devices to reach the computerized device of the organizer. Accordingly, the organizer may be waiting twice as long as necessary when sharing each new view with the audience. Moreover, such operation creates excessive processing overhead and network traffic.

In contrast to the above-described conventional approaches, improved techniques are directed to use of a sync notification to indicate when a shared screen view of a presenter device has been delivered to an audience. Such use of the sync notification alleviates the need for the organizer to ask the audience if the audience has received a new view. Additionally, delivery of the sync notification can be based on a time estimation rather than be gated by actual acknowledgement thus enabling a presenter to begin speaking with confidence that a majority of the other participants have received an update to a shared screen. Moreover, the sync notification can be used in combination with a progress indicator, both of which can be displayed in an innocuous manner outside of an online meeting control panel, to provide the presenter with the ability to anticipate just when to start speaking (e.g., a countdown). Such techniques improve efficiency (e.g., less time waiting) as well as the experience of all participants.

One embodiment is directed to a method of providing a sync notification to indicate when a shared screen view of a presenter device has been delivered to an audience. The method includes generating a sync time estimation based on communications with a set of audience devices, and detecting occurrence of an update to the shared screen view of the presenter device. The method further includes outputting, after the sync time estimation has elapsed since the detected occurrence of the update, the sync notification on the presenter device to indicate when the shared screen view of the presenter device has been delivered to the audience. Such an embodiment is well suited for a variety of online collaboration systems such online conference systems, online webinar systems, online meeting systems, and so on.

In some arrangements, the method further includes rendering a progress indicator on the presenter device to display progress in delivery of the shared screen view to the audience (i) after detecting the occurrence of the update to the shared screen view of the presenter device, (ii) prior to outputting the sync notification on the presenter device, and (iii) while waiting for the sync time estimation to elapse.

In some arrangements, rendering the progress indicator on the presenter device includes outputting a delivery completion measure on a display of the presenter device.

In some arrangements, outputting the delivery completion measure includes displaying the delivery completion measure separately from the shared screen view to prevent the audience from seeing the delivery completion measure.

In some arrangements, displaying the delivery completion measure separate from the shared screen view includes rendering a series of graphics to illustrate an increasing number of audience devices on the display of the presenter device.

In some arrangements, displaying the delivery completion measure separate from the shared screen view includes rendering a series of graphics to illustrate an increasing percentage of audience devices on the display of the presenter device.

In some arrangements, displaying the delivery completion measure separate from the shared screen view includes rendering a series of graphics to illustrate a decreasing estimate of the number of seconds before the update to shared screen view will have been shown to the audience members by their devices.

In some arrangements, outputting the sync notification on the presenter device includes displaying, on the presenter device, the sync notification in place of the progress indicator.

In some arrangements, generating the sync time estimation includes obtaining a collection of time delay measurements. Each time delay measurement identifies a time delay in delivering a particular shared screen view to a particular audience device. In these arrangements, generating the sync time estimation further includes deriving the sync time estimation based on the collection of time delay measurements.

In some arrangements, obtaining the collection of time delay measurements includes quantifying, as the time delay measurements, amounts of time required for the audience devices to receive shared screen views and automatically acknowledge receipt of the shared screen views. For example, increasingly, devices are provisioned with highly accurate and precisely synchronized clock circuits for their global positioning system (GPS) circuitry, and such clock circuits are suitable for measuring the "on-the way" delay accurately without any complex algorithms.

In some arrangements, the shared screen views are conveyed from the presenter device to the audience devices through point-to-point communications between the presenter device and the audience devices. In these arrangements, quantifying the amounts of time includes measuring time as the shared screen views are conveyed from the presenter device to the audience devices via the point-to-point communications.

In some arrangements, the shared screen views are conveyed from the presenter device to the audience devices through an online server. In these arrangements, quantifying the amounts of time includes measuring time as the shared screen views are conveyed from the presenter device to the audience devices through the online server.

In some arrangements, the collection of time delay measurements represent roundtrip communication measurements. In these arrangements, deriving the sync time estimation based on the collection of time delay measurements includes generating a round trip time estimation based on the collection of time delay measurements, and reducing the round trip time estimation by a reducing factor to derive the sync time estimation.

In some arrangements, generating the round trip time estimation includes performing a first operation using the collection of time delay measurements as input to identify a mean amount, performing a second operation using the collection of time delay measurements as input to identify a standard deviation amount, and providing the round trip time estimation based on the mean amount and the standard deviation amount.

In some arrangements, reducing the round trip time estimation by the reducing factor includes cutting the round trip time estimation in half to form the sync time estimation.

Another embodiment is directed to a computer program product having a non-transitory computer readable medium which stores a set of instructions to provide a sync notification to indicate when a shared screen view of a presenter device has been delivered to an audience. The set of instructions, when carried out by computerized circuitry of a presenter device, causes the computerized circuitry to:

(A) generate a sync time estimation based on communications with a set of audience devices;

(B) detect occurrence of an update to the shared screen view of the presenter device; and (C) after the sync time estimation has elapsed since the detected occurrence of the update, output the sync notification on the presenter device to indicate when the shared screen view of the presenter device has been delivered to the audience.

Yet another embodiment is directed to electronic circuitry to provide a sync notification to indicate when a shared screen view of a presenter device has been delivered to an audience. The electronic circuitry includes a network interface, memory, and control circuitry coupled to the network interface and the memory. The memory stores instructions which, when carried out by the control circuitry, cause the control circuitry to:

(A) generate a sync time estimation based on communications with a set of audience devices, (B) detect occurrence of an update to the shared screen view of the presenter device, and (C) after the sync time estimation has elapsed since the detected occurrence of the update, output the sync notification on the presenter device to indicate when the shared screen view of the presenter device has been delivered to the audience.

It should be understood that, in the cloud context, some electronic circuitry is formed by remote computer resources distributed over a network. Such a computerized environment is capable of providing certain advantages such as distribution of hosted services and resources (e.g., software as a service, platform as a service, infrastructure as a service, etc.), enhanced scalability, etc.

Other embodiments are directed to electronic systems and apparatus, processing circuits, computer program products, and so on. Some embodiments are directed to various methods, electronic components and circuitry which are involved in providing a sync notification to indicate when a shared screen view of a presenter device has been delivered to an audience.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to using a sync notification to indicate when a shared screen view of a presenter device has been delivered to an audience. Use of such a sync notification alleviates the need for an organizer to ask the audience whether the audience has received a new view. Additionally, delivery of the sync notification can be based on a time estimation instead of being dependent on actual acknowledgement thus enabling a presenter to begin speaking with confidence that at least most of the participants have received an update to a shared screen. Moreover, the sync notification can be used in combination with a progress indicator, both of which can be displayed in a non-obstructive but easily visible manner and outside of an online meeting control panel, to provide the presenter with the ability to easily predict when to start speaking (e.g., a countdown). Such a technique improves efficiency (e.g., less time waiting) as well as the experience of all participants (e.g., the presentation moves at a faster pace). Such a technique is well suited for a variety of online collaboration systems for online conferences, online webinars, online meetings, other types of online collaboration sessions, etc.

Figure 1:
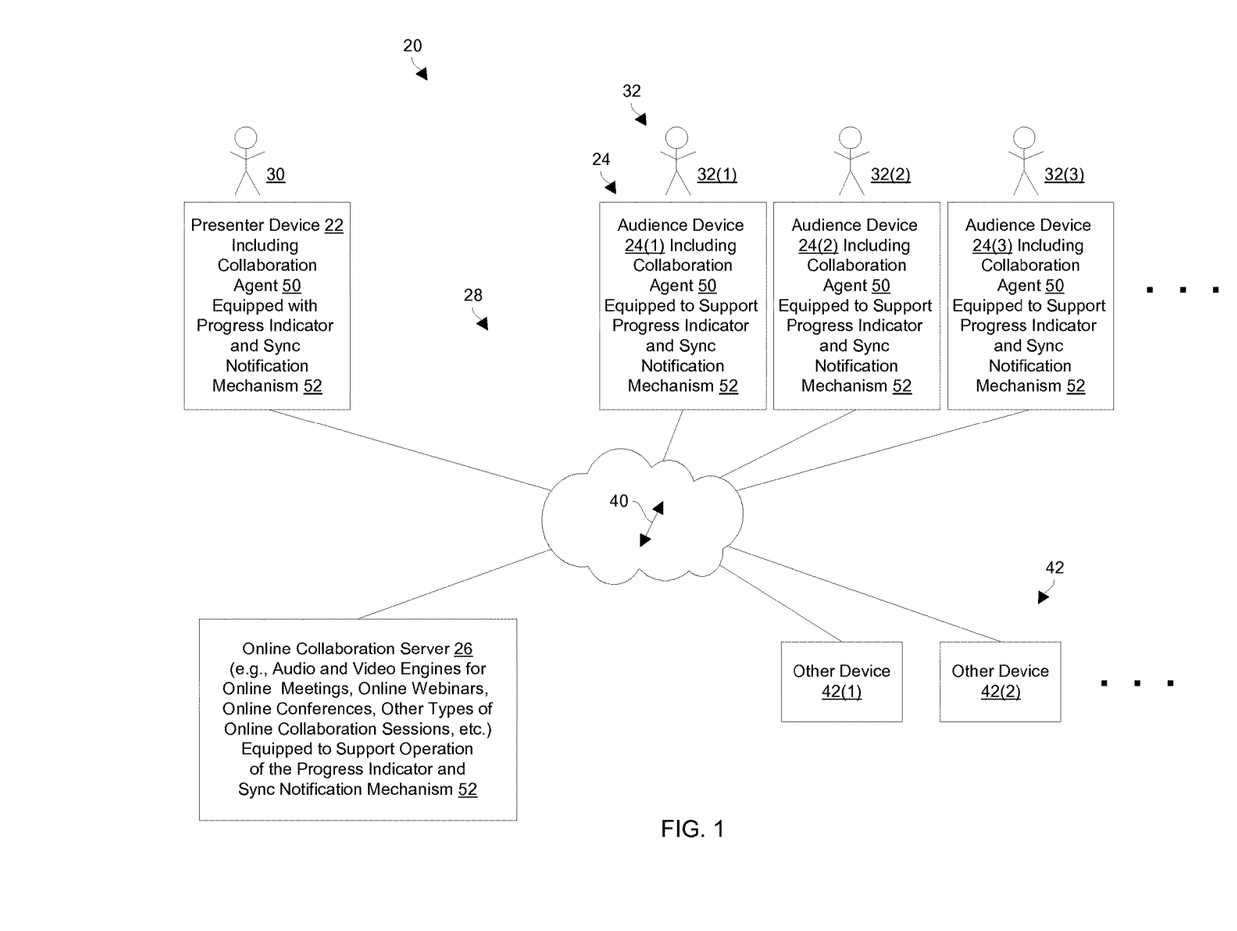
FIG. 1 is a block diagram of a computerized online collaboration setting which uses a sync notification to indicate when a shared screen view of a presenter device has been delivered to an audience.

FIG. 1 is a block diagram of a computerized online collaboration setting 20 which uses a sync notification (e.g., a special graphic) to indicate when a shared screen view of a presenter device has been delivered to an audience. The computerized online collaboration setting 20 includes a presenter device 22, audience devices 24(1), 24(2), 24(3), . . . (collectively, audience devices 24), an online collaboration server 26, and a communications medium 28.

The presenter device 22 is constructed and arranged to join and participate in online collaborative events (e.g., online meetings, online webinars, online conferences, etc.) on behalf of a human presenter 30. Suitable hardware for the presenter device 22 includes a general purpose computer, a desktop workstation, a laptop computer, a tablet, a smartphone, and so on.

Similarly, the audience devices 24 are constructed and arranged to join and participate in online collaborative events on behalf of human audience members 32. As shown in FIG. 1, the audience device 24(1) is operated by audience member 32(1), the audience device 24(2) is operated by audience member 32(2), the audience device 24(3) is operated by audience member 32(3), and so on. Suitable hardware for the audience devices 24 include a general purpose computer, a desktop workstation, a laptop computer, a tablet, a smartphone, etc.

It should be understood that, during an online collaboration event, the capability exists for an audience device to become the new presenter device, and for the original presenter device to become an audience device. During such a transition, the human audience member of the new presenter device becomes the new presenter, and the original presenter becomes a member of the audience.

The online collaboration server 26 is constructed and arranged to reliably and robustly manage online collaboration events involving the presenter device 22 and audience devices 24 on behalf of users, e.g., the presenter 30 and audience members 32. In some arrangements, the online collaboration server 26 mainly manages user registration, user profiles, user verification, etc. and the various devices 22, 24 collaborate via point-to-point communications. In other arrangements, the online collaboration server 26 includes specialized circuitry (e.g., a video engine, an audio engine, etc.) to further perform centralized content processing operations (e.g., distribution and adjustment of video content, mixing and distribution of audio content, etc.).

In some arrangements, the online collaboration server 26 is formed by multiple computers organized in a cluster. In other arrangements, the online collaboration server 26 is formed by a server farm. In yet other arrangements, the online collaboration server 26 is formed by distributed circuitry, i.e., the online collaboration server 26 is located in the "cloud".

The communications medium 28 is constructed and arranged to connect the various components of the computerized online collaboration setting 20 together to enable these components to exchange electronic signals 40 (e.g., see the double arrow 40). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, cellular communications, plain old telephone service (POTS) communications, combinations thereof, and so on.

It should be understood that the computerized setting 20 may include other devices 42(1), 42(2), . . . (collectively, other devices 42) which do not necessarily participate in the online collaboration events. Nevertheless, the other devices 42 may contribute network traffic and therefore affect latency for communications exchanged between the presenter device 22, the audience devices 24, and the online collaboration server 26 during the online collaboration events.

At this point, it should be understood that the presenter device 22 includes a collaboration agent 50 which is equipped with a progress indicator and sync notification mechanism 52 to display a set of graphics or image objects to inform the presenter 30 when an updated shared screen view on the presenter device 22 has been delivered to the audience. Likewise, the audience devices 24 include collaboration agents 50 to support such operation. Additionally, in arrangements where distribution of content is centralized through the online collaboration server 26, the online collaboration server 26 is equipped to support such operation.

One should appreciate that the collaboration agents 50 operating within each of the presenter device 22 and the audience devices 24 to join and participate in an online collaboration event. Such collaboration agents 50 may be formed by processing circuitry executing specialized code.

In contrast to conventional devices which may include agents which simply join web conferences, the collaboration agents 50 provide progress indicator and sync notification mechanism functionality. In particular, the collaboration agent 50 of the presenter device 22 outputs a series of progress indicators and a sync notification to the presenter 30 to enable the presenter 30 to know when to begin discussing each new screen view which has been distributed to the audience. The collaboration agent 50 of each audience device 24 communicates back in response to receiving each new screen view to support such operation.

It should be understood that the collaboration agent 50 of the presenter device 22 detects when the presenter 30 updates a shared screen view (e.g., changes to the next slide of a slide show, navigates to another page in a document, etc.). The collaboration agent 50 of the presenter device 22 further displays a series of progress indicators to the presenter 30 informing the presenter 30 of how much of the audience has received the update to the shared screen view. Additionally, the collaboration agent 50 of the presenter device 22 outputs a sync notification once the audience is deemed to have received the update to the shared screen view.

It should be understood that the presenter device 22 considers a first screen view to have been updated or changed to a second screen view when the presenter device 22 discovers a substantial change in the first screen view. The measure of such change can be a simple percentage (e.g., more than 70% of the screen view, more than 60%, more than 50%, etc.). Alternatively, the measure of such a change can be time-based (e.g., more than 40% of the screen view over the course of three seconds, etc.). In some arrangements, the collaboration agent 50 hooks into the program being presented (e.g., the application programming interface of the slideshow or document program) to determine when a slide/page/etc. is changed. Other change determination techniques are suitable for use as well. Another suitable screen view change detection technique is disclosed in U.S. application Ser. No. 14/666,907, filed on Mar. 24, 2015 and entitled "GENERATION OF SCREENSHOTS FOR A VISUAL SUMMARY OF AN ONLINE MEETING UNDER DIVERSE AND/OR VARYING NETWORK AND/OR CLIENT COMPUTER PERFORMANCE CONDITIONS," the contents and teachings of which are hereby incorporated by reference in their entirety.

As will be explained in further detail below, the collaboration agent 50 of the presenter device 22 estimates how much time delivery of an update takes to reach the audience devices 24 from the presenter device 22. It should be appreciated that such an estimate alleviates the need for the presenter 22 to wait for all of the audience devices 24 to acknowledge receipt of the update. Moreover, the presenter 22 does not need to ask the audience if the audience has received the update since the presenter 22 can rely on the sync notification. Further details will now be provided with reference to FIG. 2.

Figure 2:
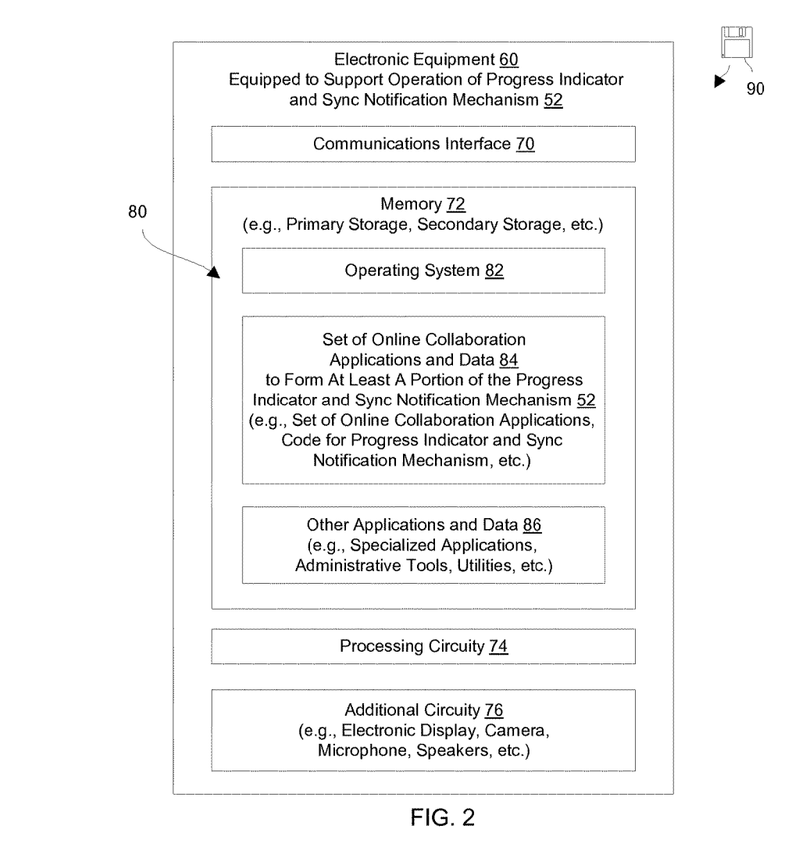
FIG. 2 is a block diagram of an electronic apparatus which is suitable for use in the computerized online collaboration setting of FIG. 1.

FIG. 2 is a block diagram of electronic equipment 60 which is equipped to support operation of the progress indicator and sync notification mechanism 52 (also see FIG. 1). In particular, the electronic equipment 60 is suitable for forming any of the devices of the computerized online collaboration setting 20, i.e., the presenter device 22, an audience device 24, the online collaboration server 26, etc. As shown, the electronic equipment 60 includes a communications interface 70, memory 72, processing circuitry 74, and additional circuitry 76.

The communications interface 70 is constructed and arranged to connect the electronic equipment 60 to the communications medium 28 (FIG. 1). Accordingly, the communications interface 70 enables the electronic equipment 60 to communicate with the other components of the computerized online collaboration setting 20. Such communications may be line-based or wireless (i.e., IP-based, cellular, combinations thereof, and so on).

The memory 72 is intended to represent both volatile storage (e.g., DRAM, SRAM, etc.) and non-volatile storage (e.g., flash memory, magnetic disk drives, etc.). The memory 72 stores a variety of software constructs 80 including an operating system 82, a set of specialized online collaboration applications and data 84, and other applications and data 86.

The processing circuitry 74 is constructed and arranged to operate in accordance with the various software constructs 80 stored in the memory 72. In particular, the processing circuitry 74, when executing the operating system 82, manages various resources of the electronic equipment 60 (e.g., memory allocation, processor cycles, hardware compatibility, etc.).

Additionally, the processing circuitry 74 operating in accordance with the set of collaboration applications and data 84 forms specialized control circuitry to perform particular online collaboration operations such as support operation of the progress indicator and sync notification mechanisms 52 during an online collaboration event. In particular, if the electronic equipment 60 is a presenter device 22, the processing circuitry 74 can execute an online collaboration application to form a specialized collaboration agent 50 which schedules online collaboration events, joins online collaboration events, provides the presenter 30 with progress indicators and sync notifications to guide the presenter 30, etc. Alternatively, if the electronic equipment 60 is an audience device 24, the processing circuitry 74 can execute an online collaboration application to form another specialized collaboration agent 50 which schedules online collaboration events, joins online collaboration events, and provides progress indicator and sync notification data to support the mechanism 52. Furthermore, if the electronic equipment 60 is the online collaboration server 26, the processing circuitry 74 can execute an online collaboration application to form specialized collaboration circuitry including a video engine to receive and distribute video content, an audio engine to aggregate and distribute a combined audio signal from individual audio signals, and sync control circuitry to control particular aspects of the progress indicator and sync notification mechanism 52 (e.g., to facilitate and/or perform time measurements), etc.

Furthermore, the processing circuitry 74 operating in accordance with the other applications and data 86 forms other specialized circuitry to perform other operations. If the electronic equipment 60 is a presenter device 22 or an audience device 24, the other applications may include a slide show application to present a slide show, a word processing application to open/edit/view a document, and a browser application, among others. On the other hand, if the electronic equipment 60 is the online collaboration server 26, the other operations may include administrative tools, services and utilities, other server-based operations, and so on.

The additional circuitry 76 is constructed and arranged to perform other operations. For example, the additional circuitry 76 may include a user interface such as a display, a camera, a microphone, a set of speakers, etc.

It should be understood that the above-mentioned processing circuitry 74 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software to the electronic equipment 60. The computer program product 90 has a non-transitory and non-volatile computer readable medium which stores a set of instructions to control one or more operations of the electronic equipment 60. Examples of suitable computer readable storage media include tangible articles of manufacture and apparatus which store instructions in a non-volatile manner such as CD-ROM, flash memory, disk memory, tape memory, and the like. Further details will now be provided with reference to FIG. 3.

Figure 3:
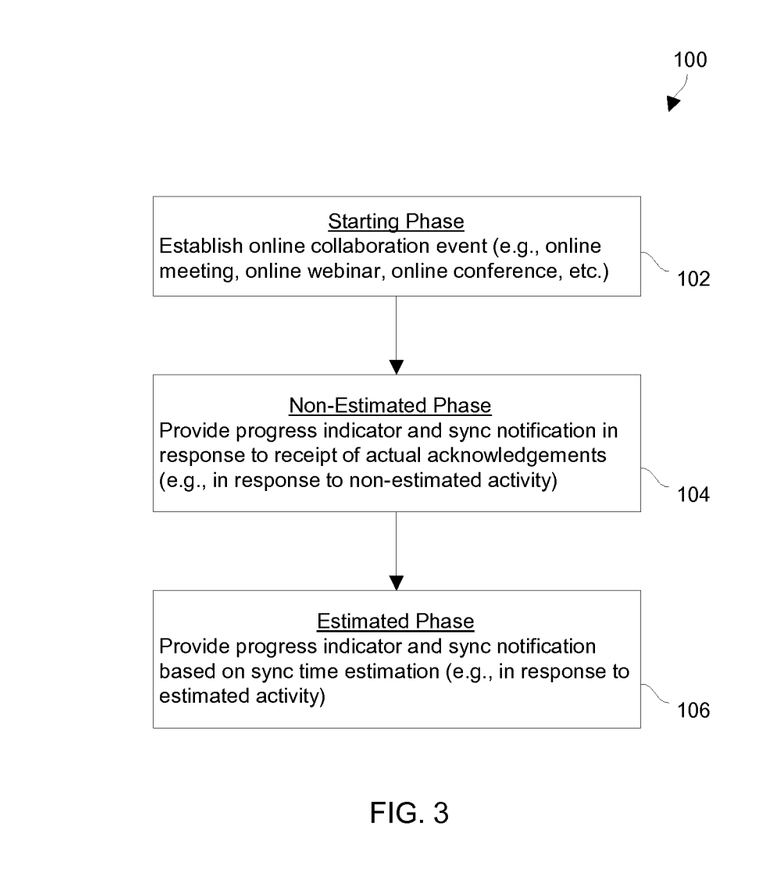
FIG. 3 is a block diagram illustrating various operational phases of the electronic apparatus of FIG. 2.

FIG. 3 shows that the presenter device 22 transitions through a series of different operating phases 100 during an online collaboration event in which the presenter device 22 shares a screen view with the audience devices 24 (also see FIG. 1). The series of different operating phases 100 includes a starting phase 102 in which there are no progress indicators or sync notifications provided to the presenter 30, a non-estimated operating phase 104 in which there are progress indicators and sync notifications provided to the presenter 30 based on receipt of actual communications for every new view, and an estimated operating phase 106 in which there are progress indicators and sync notifications provided to the presenter 30 based on estimated delivery of new views to the audience devices 24.

In the starting phase 102 (FIG. 3), the presenter device 22 starts an online collaboration event. Along these lines, the collaboration agents 50 of the presenter device 22 and the audience devices 24 establish connections with the online collaboration server 26 to join the online collaboration event in a traditional manner. Here, each human user (i.e., the presenter 30 and audience members 32) may click on a link, press a button, etc. to direct their respective devices 22, 24 to join the event. In response, the respective devices 22, 24 communicate with the online collaboration server 26 to begin the online collaboration event. At this point, the collaboration agent 50 of the presenter device 22 may provide the presenter 30 with a control panel to control sharing of a screen view and a microphone signal with the audience devices 24.

In the non-estimated operating phase 104, the presenter device 22 shares the screen view with the audience devices 24 (e.g., a slide show) and displays a series of progress indicators (e.g., measures of how many audience devices 24 have received the latest screen view) and a sync notification (e.g., a notice indicating that the audience has received the latest screen view and that the presenter 22 can begin talking). The progress indicator and sync notification are rendered to the presenter 30 in response to actual acknowledgements from the audience devices 24 indicating that the audience devices 24 have received updated screen views (e.g., views of new slides of the slide show). In particular, for each substantive change in the screen view, the presenter device 22 waits until it receives confirmation messages (i.e., actual acknowledgement communications) from the audience devices 24 and then automatically outputs the progress indicator and sync notification to the presenter 30 based on these actual acknowledgements. Here, the presenter device 22 is in a "data collection mode" in terms of gathering measurements of actual amounts of time required to (i) deliver the new screen views to the audience devices 24 and (ii) receive electronic confirmations from the audience devices 24 in a feedback manner. Here, the presenter 30 does not need to ask the audience if the audience can see the latest screen view since the presenter device 22 provides the progress indicator and the sync notification to the presenter 30. After a while (e.g., after a predefined amount of time has expired, after a predefined number of updates have occurred, etc.) the collaboration agent 50 of the presenter device 22 transitions from operating in the non-estimated phase 104 to operating in the estimated phase 106.

In the estimated operating phase 106, the presenter device 22 continues to share the screen view with the audience devices 24 and automatically provide the progress indicator and sync notification to the presenter 30. However, the particular information provided in the progress indicator and the sync indicator is now based on a time estimate rather than actual acknowledgements, i.e., the time for the audience devices 24 to send acknowledgements is now predicted based on past history. Again, the presenter 30 does not need to ask the audience members 32 if the audience members 32 can see the latest screen view. Furthermore, the presenter 30 does not need to wait for every acknowledgement from the audience devices 24 to reach the presenter device 22. Rather, the presenter 30 can speak while relying on the presenter device 22 to account for proper delivery of the latest screen view to the audience members 32. Further details will now be provided with reference to FIGS. 4 and 5.

Figure 4:
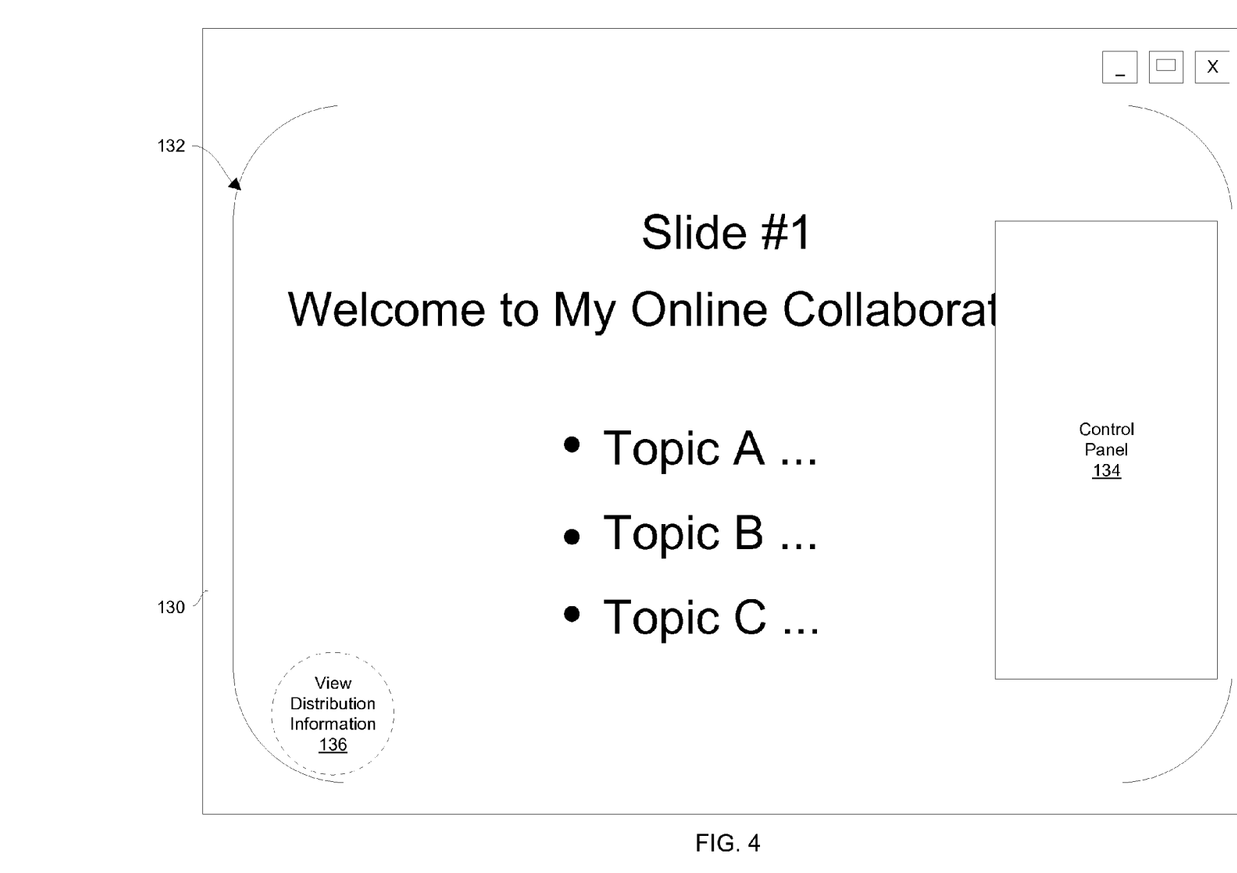
FIG. 4 is an example view of a display of a presenter device of the computerized online collaboration setting.
Figure 5:
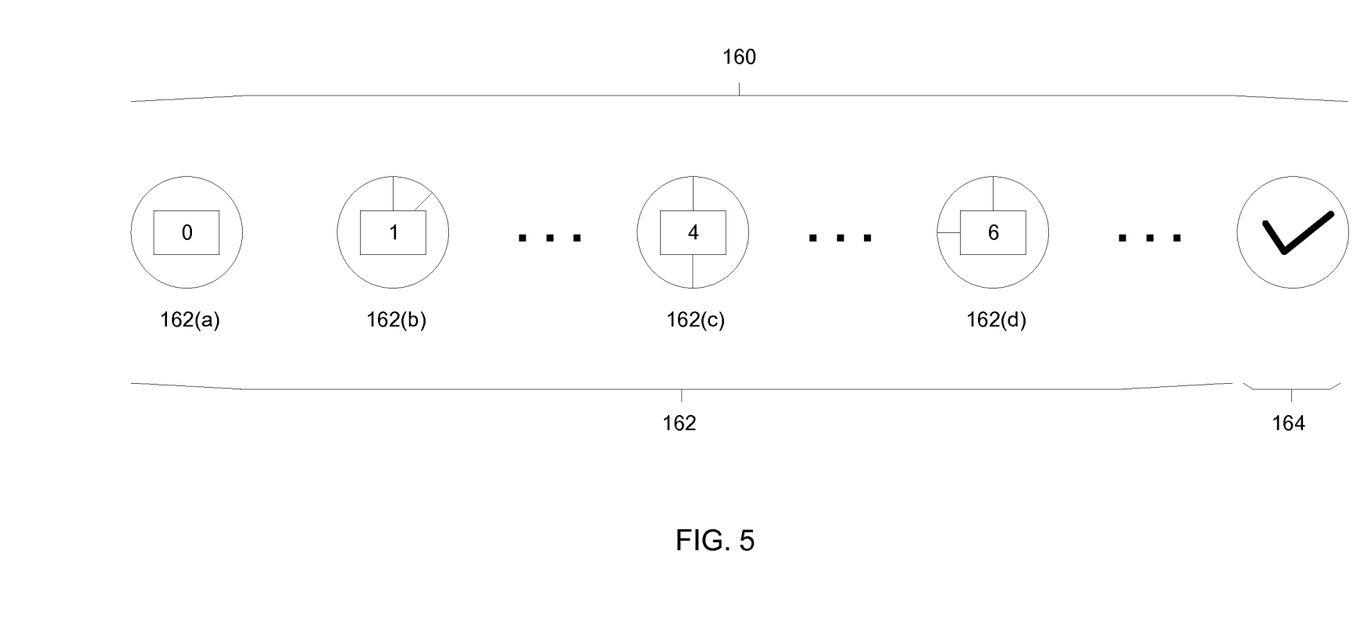
FIG. 5 is a series of close up views of an example progress indicator and an example sync notification of the view of FIG. 4.

FIGS. 4 and 5 show particular view details of the presenter device 22. In particular, FIG. 4 shows an example view of an electronic display 130 of the presenter device 22. FIG. 5 shows a series of example progress indicators and an example sync notification which are rendered on the electronic display 130.

As shown in FIG. 4 and by way of example, the electronic display 130 of the presenter device 22 renders a slide of a slide show as a current screen view 132. The electronic display 130 further renders a control panel 134 and view distribution information 136.

The presenter device 22 shares the current screen view 132 with all of the audience devices 24. Accordingly, over the course of a presentation/conference/etc., the presenter 30 is able to share slides and/or other content with the audience members 32 (also see FIG. 1).

The control panel 134 is a graphical user interface (GUI) which enables the presenter 30 to control various aspects of the online collaboration event. For example, by pushing buttons or operating other controls of the control panel 134, the presenter 30 is able to mute or unmute the presenter's microphone, start or stop recording of the presentation, end the presentation, and so on. It should be understood that the control panel 134 may take up area on the electronic display 130 and thus obscure a portion of the shared screen view 132 preventing the preventer 30 from seeing what it underneath the control panel 134. Optionally, the presenter 30 may minimize or move the control panel off of the display 130 in order to see the shared screen view 132.

The view distribution information 136 is the data regarding delivery of the shared screen view 132 to the audience devices 24. In particular, the view distribution information 136 initially includes a series of progress indicators indicating how much of the audience has received a new update to the shared screen view 132. Once the presenter device 22 concludes that the audience has received the new update, the distribution information 136 includes a sync indicator which lets the presenter 30 know that the presenter 30 should begin speaking in connection with the new update.

It should be understood that the view distribution information 136 is positioned in a location which is different than that of the control panel 134. In particular, the view distribution information 136 resides out of the way from the major content of the shared screen view 132 (e.g., in a corner, off to the side, with partial transparency, etc.). Additionally, since the view distribution information 136 is separate from the control panel 134, the view distribution information 136 remains visible to the presenter 30 even if the presenter 30 has minimized the control panel 134 or moved the control panel 134 off of the electronic display 130 (e.g., to a second screen, etc.).

FIG. 5 shows a progression 160 of graphics, namely, a series of progress indicators 162(a), 162(b), 162(c), . . . , (collectively, progress indicators 162) and a sync indicator 164. Each progress indicator 162 identifies a portion of the audience that is understood to have received a new shared screen view 132 from the presenter device 22 after the presenter 30 has changed its content (e.g., moved to a new slide in a slide show, moved to a new page in a document, etc.).

There are a variety of suitable ways of identifying a portion of the audience. Examples include providing a tally or count of audience members 32, providing a number of audience members 32 waiting to receive an update, providing a percentage of audience members 32, illustrating a slice of a pie (i.e., a pie chart) where a highlighted slice represents the portion of the audience, providing different colors to indicate degree of completion, combinations thereof, and so on. Changes in the portion enable the presenter 30 to effectively see a countdown to receipt of the sync notification 164. Accordingly, the presenter 30 is able to time when to begin discussing newly shared content.

The sync notification 164 differs from the progress indicator 162 in that the sync indicator 164 affirmatively indicates to the presenter 30 that the audience has received the new shared screen view 132 from the presenter device 22. Suitable sync indicators 164 include a check mark graphic (see FIG. 5), a word (e.g., "Go", "Delivered", "Speak", etc.), a color (e.g., bright green), combinations thereof, and so on. It should be understood that the sync indicator 164 does not necessarily guarantee that all of the audience has received the newly shared content since it is based on a time estimate derive from collected communications data.

By way of example, suppose that for a particular online collaboration event there are eight (8) different audience devices 24 and audience members 32 that have joined a meeting (also see FIG. 1). In particular, each of the presenter device 22 and the audience devices 24 executes a specialized application (or app) to form a local collaboration agent 50 (also see the set of collaboration applications and data 84 in FIG. 2), and the collaboration agents 50 communicate with the online collaboration server 26 to establish and start the event (also see the starting phase 102 in FIG. 3).

Once the presenter device 22 has started the online collaboration event, the collaboration agent of the presenter device 22 shows, on the electronic display 130 of the presenter device 22, a screen view 132 and shares the screen view 132 with the audience devices 24 (FIG. 4). Such sharing may take place in response to the presenter 30 manually directing the presenter device 22 to share the screen view 132. Alternatively, such sharing may take place by default based on pre-configuration of the presenter device 22 to share the screen view 132 upon beginning the collaboration event.

With the presenter's screen view 132 now being shared with the audience devices 24, the presenter device 22 is configured to detect a substantive change in the screen view 132 (e.g., a change in a predetermined percentage of the screen view 132) and, in response to such a detected change, send a special update request to each audience device 24 requesting acknowledgement of that update request. In some arrangements, the special update request includes a timestamp and the acknowledgement from each audience device 24 includes that timestamp to uniquely identify each special update request.

Upon receipt of the acknowledgements, the presenter device 22 calculates the round trip communication time from the presenter device 22 to each audience device 24. Other round trip communication time measurement techniques are suitable for use as well, e.g., dedicated counters, timers, etc. As the collaboration agent 50 of the presenter device 22 receives acknowledgement backs from each audience device 24, that collaboration agent 50 updates the view distribution information 136 (FIG. 4) as to how much of the audience that has received the update to the screen view (FIG. 5). Eventually, when all (or most) of the audience devices 24 have acknowledged receipt, the collaboration agent 50 outputs the sync notification 164 and the presenter 30 begins discussing the new screen view without having to ask the audience members 32 if they can see the update.

In accordance with the example of eight (8) audience devices 24, the progress indicator 162(a) shows that none of the audience devices 24 has received an update from the presenter device 22. The progress indicator 162(b) shows that one of the audience devices 24 (12.5% or one eighth) has received the update from the presenter device 22. The progress indicator 162(c) shows that four of the audience devices 24 (50% or one half) has received the update from the presenter device 22. The progress indicator 162(c) shows that six of the audience devices 24 (75% or three fourths) has received the update from the presenter device 22. Finally, the sync indicator 164 shows that the audience is deemed to have received the update and that the presenter 30 may begin discussing the update.

The presenter device 22 and the audience devices 24 continue to communicate in this manner over the course of several updates, and round trip communication time is collected over time. During this phase of operation, it should be understood that the presenter device 22 outputs the progression 160 of graphics (FIG. 5) in response to receipt of actual acknowledgements from the audience devices 24 (also see the non-estimated phase 104 in FIG. 3).

After a predefined amount of round trip communication time data has been collected (e.g., after a predefined amount of time has elapsed during the online collaboration event such as two or three minutes, after a predefined number of updates has been distributed such as in response to four or five slides, etc.), the presenter device 22 transitions to a mode in which the presenter device 22 estimates when the audience has received new updates (also see the estimated phase 106 in FIG. 3). Here, the presenter device 22 no longer outputs the progression 160 of graphics in response to receipt of actual acknowledgements from the audience devices 24. Rather, here the presenter device 22 derives a time estimate based on the collected round trip communication time data, and outputs the progression 160 of graphics in accordance with the time estimate (e.g., half the average worst case round trip communication time). Accordingly, the presenter 30 is able to easily predict when to start speaking (e.g., by watching the progress indicators 162) and knows when to begin discussing a new update (e.g., by receiving the sync notification 164). As a result, the online collaboration event is able to move forward with improved efficiency (e.g., less time waiting) and all of the participants share a more enjoyable experience (e.g., the presentation moves at a faster pace). Further details will now be provided with reference to FIG. 6.

Figure 6:
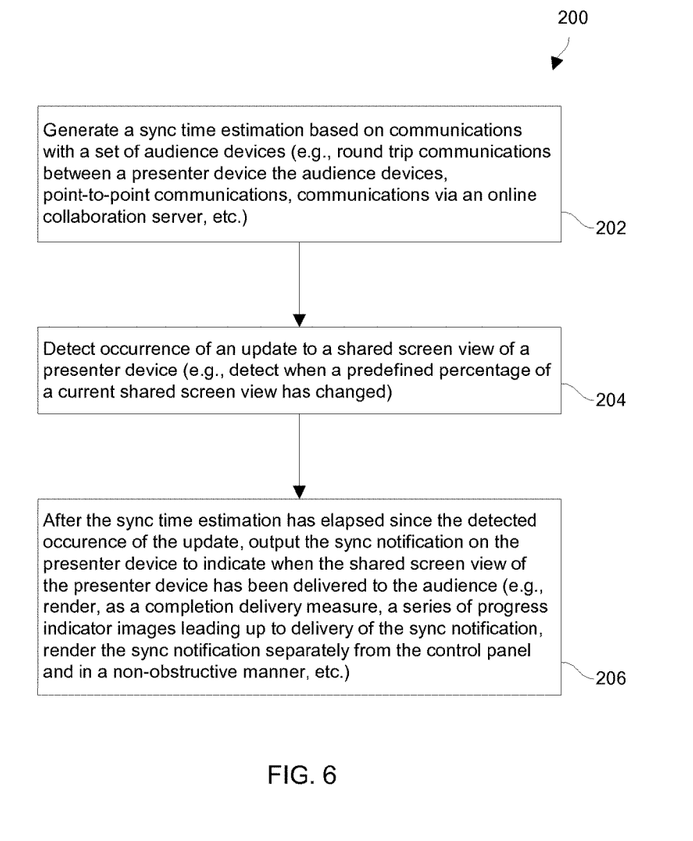
FIG. 6 is a flowchart of a procedure which is performed by the computerized online collaboration setting of FIG. 1.

FIG. 6 is a flowchart of a procedure 200 which is performed by the computerized online collaboration setting 20 to provide a sync notification to indicate when a shared screen view of a presenter device 22 has been delivered to an audience (also see FIG. 1). It should be understood that one or more of these activities can be performed by a particular component of the setting 20 (e.g., the presenter device 22, the online collaboration server 26, etc.) or by collaboration of multiple devices in a distributed manner.

Prior to 202, circuitry of the computerized online collaboration setting 20 collects round trip communication time data during a portion of the event. That is, as the screen view of the presenter device 22 is shared with the audience devices 24, update requests are sent from the presenter device 22 to the audience devices 24, and acknowledgements are sent back in order to determine round trip communication time (also see the non-estimated phase 104 in FIG. 3).

At 202, the circuitry of the computerized online collaboration setting 20 generates a sync time estimation based on the collected round trip communication time data. For example, the sync time estimation can be set to half of the average worst case round trip communication time. Reducing factors other than a half are suitable for use as well (e.g., 45%, 40%, etc.). Such factors can be tuned/adjusted/etc. to enable the system to account for particular bandwidth, the size/capacity of the wire of the sent update, etc.

At 204, the circuitry of the computerized online collaboration setting 20 detects occurrence of an update to the shared screen view of the presenter device. As mentioned earlier, such detection can be triggered by determining when a predefined percentage of a current shared screen view has changed.

At 206 and after the sync time estimation has elapsed since the detected occurrence of the update, the circuitry of the computerized online collaboration setting 20 outputs the sync notification 164 on the presenter device 22 to indicate when the shared screen view of the presenter device 22 has been delivered to the audience. In some arrangements, the sync notification 164 is located separately from the control panel to enable the presenter 30 to minimize or move the control panel off the screen view and still see the sync notification 164.

As explained earlier, leading up to delivery of the sync notification 164, the presenter device 22 may provide a series of progress indicators 162 which identifies how much of the audience is deemed to have received the update. Such a delivery completion measure may be located in the same place as the sync notification 164 and separately from the control panel 134 to the online collaboration event.

As described above, improved techniques are directed to use of a sync notification 164 to indicate when a shared screen view 132 of a presenter device 22 has been delivered to an audience. Such use of the sync notification 164 alleviates the need for the organizer to ask the audience if the audience has receive a new view 132. Additionally, delivery of the sync notification 164 can be based on a time estimation rather than be gated by actual acknowledgement thus enabling a presenter 30 to begin speaking with confidence that a majority of the other participants 32 has received an update to a shared screen 132. Moreover, the sync notification 164 can be used in combination with a progress indicator 162, both of which can be displayed in an innocuous manner outside of an online meeting control panel 134, to provide the presenter 30 with the ability to anticipate just when to start speaking (e.g., a countdown). Such techniques improve efficiency (e.g., less time waiting) as well as the experience of all participants.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the online collaboration server 26 (FIG. 1) are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, one should appreciate that this above-described techniques amount to more than simply providing a sync notification to a presenter. Rather, the techniques involve detecting an update to a shared screen view of a presenter device and outputting a sync notification based on a time estimate. Thus, the presenter does not need to ask the audience if the audience has received the update. Furthermore, the presenter is able to time when the presenter should begin speaking about the update.

Furthermore, one should appreciate that in accordance with some arrangements, the progression 160 of graphics (FIG. 5) provides an unobtrusive, easy-to-see indicator of how many/what percentage of viewers in a screen-sharing session have received the latest significant screen update (e.g., a slide), and how long before all (or most) of the viewers will receive the update.

Additionally, one should appreciate that if the system always made sure the audio and screen and video were in sync, the above-described timing aspects may not be an issue. This becomes an issue because usually audio needs less bandwidth and is given priority over video and screen updates when there are network and bandwidth issues. So, frequently, the audio arrives well before the video and the screen update. To address this issue and in accordance with certain arrangements, the system assumes that the audio arrives instantaneously and calculates only the screen update delay. In accordance with other arrangements, the system accounts for the audio delay as well, and calculates how long screen updates arrive after the audio arrives. In these other arrangements, the system then subtracts the audio delay from the screen update delay thus enabling the system to adjust for the audio delay. One should appreciate that audio delay estimates may be available from the audio conference system.

In connection with conventional web conferences, one of the most common questions that presenters ask while sharing their computer screens is "Do you see my new screen?" Along these lines, it may be very important for presenters to know if attendees can view the content they want to share. Screen sharing involves data transfer between different computers at different locations, and there usually are delays between what a presenter is showing vs. what attendees are seeing. Certain embodiments address the issue by providing a status indicator to the presenter indicating whether attendees are seeing the visual that the presenter wants them to see.

Further, it provides the presenter an estimate of how long a screen change takes to reach all attendees, so they can account for it as they speak.

In connection with an example, suppose that a presenter is sharing a slide show wants to know if all attendees are viewing the same slide as currently on the presenter's screen. With certain embodiments, a small unobtrusive status indicator is displayed on the presenter's screen. Whenever there is a significant change in the presented screen/application (e.g. slide change) an agent on the presenter's device 22 considers this as an update. The user interface of the presenter's device 22 displays an unobtrusive status indicator (i.e., a sync notification) that shows how many viewers have received the latest update, and what is the estimated time for the update to be received by all/most attendees.

In connection with FIG. 5, the example involved eight viewers. Say the presenter device 22 moves from slide 1 to slide 2. The collaboration agent 50 detects this as an update. Hence, a counter of the collaboration agent 50 for the progress indicator resets to 0, and an UpdateSent message is sent to the audience devices 24. As the update and the NewUpdateSent message reaches the audience devices 24, they send UpdateReceived messages back to the presenter device 22. As the UpdateReceived is received, the displayed count increments from 0 to 8 and then turns into a checkmark confirming that all attendees are viewing the latest update (slide 2).

Meanwhile, the delay estimate feature of the collaboration agent 50 observes how long it is taking for the update to get to all/most of the users, and adds it to the delay statistics. Once enough statistics are collected, it shows an estimate of how long the next update will take to be delivered to all/most attendees. When another screen update is sent, the estimate is shown in the UI and then it counts down from there so the presenter 30 has an idea of how long it will take until the update has reached everyone.

Also, once enough statistics are gathered, the delay estimate feature of the collaboration agent 50 of the presenter device 22 starts estimating when the updates will reach the viewers, based on historical data, and the status indicator count is decreased based on these estimates. The is done because waiting for the UpdateReceived messages back from the viewer, also counts the time it takes the message from the viewer to get back to the presenter 30. Thus, for large webinars, it can make the delay look twice as bad as it actually is. The current techniques us estimates thus giving the presenter 30 a more realistic estimate.

In accordance with certain arrangements, the delay estimate feature has three parts: 1. Detecting a significant update, 2. Managing the receipts confirming that a viewer has displayed the update, and 3. Updating delay statistics needed for the delay estimate.

1. Update Detection Part: Essentially, if the screen has changed significantly followed by an interval of no changes, the feature decides that there is a significant new update. When the feature detects that a video is playing on the screen (constant stream of updates without any significant quiet period in between), the feature considers significant updates to take place at a constant period of say 5 seconds.
2. Confirmation Receipts Part: This can be done in several different ways, here are two:
   a. Point to point: When the update detection feature (listed in 1.) detects a change, it sends a message to all viewers that it has an update, and the corresponding update identifier. The audience devices 24 respond when they receive the update, telling the presenter device 22 that they have displayed the update.
   b. Client/Server: Putting the counting logic in the multicast server can better scale the update detection feature. Here, a multicast server already tracks which audience device 24 has received an update. The server can hence keep a track of the updates to match the presenter and viewer screens and inform the presenter as the updates reach viewers. Clearly this is more scalable. As the number of viewers gets large say in a webinar of 1000 attendees, the presenter device 22 is prevented from getting too many messages since there server is there to handle them.
3. Delay Statistics Part: The message in part 2 that informs the audience devices 24 that a new update has been sent out also has a timestamp. When the receiver audience device 24 sends a receipt message, it includes this timestamp. Based on this a round trip delay can be calculated to a particular viewer, for that update. The feature can use this data to estimate the time it takes for the update to reach all viewers in a few ways:
   a. Longest Delay Statistics: The detection circuitry maintains a list (LD) of last K (around 5-20) longest delays. Additionally, the detection circuitry estimates the time it will take the next update to reach all/most audience devices 24 as $½*(mean(LD)+d*std\text{-}dev(LD))$, where d is predefined to be between 2-5. Here, the control circuitry may set a ceiling or maximum value so that, if the estimate gets too large, the estimate can be capped.
   b. Individual Delay Statistics: The detection circuitry maintains lists LDi of the last K round trip delays, for the ith audience device 24. The detection circuitry calculates estimated delays for each viewer i as $Di=½*(mean(LDi)+d*std\text{-}dev(LDi))$. The detection circuitry takes the maximum of these values as the estimate of the longest delay overall. This alternative may require more data and processing, and especially for large events alternative a.) may be more suitable.
   c. Note: In some arrangements, the detection circuitry assumes that the delays are symmetric, which is why the reduction factor takes half of the round trip delay to estimate the one-way delay. Usually, delays are not perfectly symmetric, and in general, standard algorithms to deal with these corrections can be used to enhance the accuracy of the estimates. For example, if the clock circuits for GPS circuitry is employed, one-way delays can be measured with high accuracy thus allowing for corrections or adjustments simply based on the size on the wire, and the bandwidth.

It should be further understood that audience devices 24 may become unresponsive. To handle this situation, in one arrangement, the circuitry waits until it gets responses from 90% of the audience devices 24, say time dT since sending out the update. Then, the circuitry further waits for a threshold T=3*dT for any further responses. After this time has elapsed, it assumes that the rest of the viewers are non-responsive and ignores them for that update. If a set of viewers consistently respond after this threshold T, the threshold is increased slowly to up to 5. These parameters are tuned for various products, per user needs. Further refinements of this circuitry are possible, by applying a modification of a predictive algorithm as disclosed in the earlier cited reference.

Note: For simplicity above, limited bandwidth and asymmetric delays were ignored. To more accurately estimate the delay from the sender to the receiver, we can use more sophisticated approaches that take the bandwidth into account.

RTT=UpdateSize/B+Dsr+Drs, where RTT is the round trip delay, B is the bandwidth from sender to received, Dsr is the delay from sender to receiver, and Drs is the delay from the receiver to sender. For simplicity we can assume Dsr=Drs=D and the model equation becomes RTT=UpdateSize/B+2 D. If accurate synchronized clock circuits are available, the one-way delay can be measured where:

measured-one-way-delay=UpdateSize/$B$+Dsr

Thus,

Delta$RTT$=DeltaUpdateSize/$B$, or
$B$=DeltaUpdateSize/Delta$RTT$

Using this, the circuitry can estimate B and D (using a filter for estimation of system parameters using noisy data such as a Kalman filter). Alternatively, the circuitry can use bandwidth estimates from other sources and algorithms.

As disclosed herein, an improved technique provides an estimate of the number of seconds before the latest update will be shown by most viewers. This feature is useful for presenters to pace their speech appropriately.

Furthermore, certain arrangements provide improved view features as follows:
1. The indicators and notifications are unobtrusive, and always visible, in contrast to the audience view feature which is quite obtrusive and is not visible when the control panel is minimized.
2. The indicators and notifications are more insightful because they only activate in response to significant updates, not every little change in the screen.
3. The progress indicator and sync notification mechanism 52 is more scalable because the receivers don't send UpdateReceived messages for every change. Thus, such messages do not flood the infrastructure for larger sessions that is possible with the current audience view implementation.
4. The indicators and notifications are more accurate because the circuitry estimates the delay more accurately using statistics, instead of waiting until UpdateReceived messages are received.

Such modifications and enhancements are intended to belong to various embodiments of the disclosure.

What is claimed is:

1. A method of providing a sync notification to indicate when a shared screen view of a presenter device has been delivered to an audience, the method comprising:
   generating, by processing circuitry, a sync time estimation based on communications with a set of audience devices;
   detecting, by the processing circuitry, occurrence of an update to the shared screen view of the presenter device; and
   after the sync time estimation has elapsed since the detected occurrence of the update, outputting, by the processing circuitry, the sync notification on the presenter device to indicate when the shared screen view of the presenter device has been delivered to the audience;
   wherein, prior to outputting the sync notification, the presenter device displays a progress indicator that indicates a current portion of the sync time estimation that has expired since the update was detected; and
   wherein outputting the sync notification on the presenter device includes:
      in response to expiration of the sync time estimation, no longer displaying the progress indicator that indicates the current portion of the sync time estimation that has expired on the presenter device and displaying the sync notification in place of the progress indicator.

2. A method as in claim 1, further comprising:
   (i) after detecting the occurrence of the update to the shared screen view of the presenter device and (ii) while waiting for the sync time estimation to elapse, rendering the progress indicator on the presenter device to display progress in delivery of the shared screen view to the audience.

3. A method as in claim 2 wherein rendering the progress indicator on the presenter device includes:
   outputting a delivery completion measure on a display of the presenter device.

4. A method as in claim 3 wherein outputting the delivery completion measure includes:
   displaying the delivery completion measure separately from the shared screen view to prevent the audience from seeing the delivery completion measure.

5. A method as in claim 4 wherein displaying the delivery completion measure separate from the shared screen view includes:
   rendering a series of graphics to illustrate an increasing number of audience devices on the display of the presenter device.

6. A method as in claim 4 wherein displaying the delivery completion measure separate from the shared screen view includes:
   rendering a series of graphics to illustrate an increasing percentage of audience devices on the display of the presenter device.

7. A method as in claim 4 wherein displaying the delivery completion measure separate from the shared screen view includes:
   rendering a series of graphics to illustrate a decreasing estimate of the number of seconds before the update to shared screen view is shown to the audience.

8. A method as in claim 1 wherein generating the sync time estimation includes:
   obtaining a collection of time delay measurements, each time delay measurement identifying a time delay in delivering a particular shared screen view to a particular audience device, and
   deriving the sync time estimation based on the collection of time delay measurements.

9. A method as in claim 8 wherein obtaining the collection of time delay measurements includes:
   quantifying, as the time delay measurements, amounts of time required for the audience devices to receive shared screen views and automatically acknowledge receipt of the shared screen views.

10. A method as in claim 9 wherein the shared screen views are conveyed from the presenter device to the audience devices through point-to-point communications between the presenter device and the audience devices; and
    wherein quantifying the amounts of time includes:
       measuring time as the shared screen views are conveyed from the presenter device to the audience devices via the point-to-point communications.

11. A method as in claim 9 wherein the shared screen views are conveyed from the presenter device to the audience devices through an online server; and wherein quantifying the amounts of time includes:
measuring time as the shared screen views are conveyed from the presenter device to the audience devices through the online server.

12. A method as in claim 8 wherein the collection of time delay measurements represent roundtrip communication measurements; and
wherein deriving the sync time estimation based on the collection of time delay measurements includes:
generating a round trip time estimation based on the collection of time delay measurements, and
reducing the round trip time estimation by a reducing factor to derive the sync time estimation.

13. A method as in claim 12 wherein generating the round trip time estimation includes:
performing a first operation using the collection of time delay measurements as input to identify a mean amount,
performing a second operation using the collection of time delay measurements as input to identify a standard deviation amount, and
providing the round trip time estimation based on the mean amount and the standard deviation amount.

14. A method as in claim 12 wherein reducing the round trip time estimation by the reducing factor includes:
cutting the round trip time estimation in half to form the sync time estimation.

15. A method as in claim 8 wherein deriving the sync time estimation based on the collection of time delay measurements includes:
establishing the sync time estimation based on a set of bandwidth estimates.

16. A computer program product having a non-transitory computer readable medium which stores a set of instructions to provide a sync notification to indicate when a shared screen view of a presenter device has been delivered to an audience, the set of instructions, when carried out by computerized circuitry of a presenter device, causing the computerized circuitry to:
generate a sync time estimation based on communications with a set of audience devices;
detect occurrence of an update to the shared screen view of the presenter device; and
after the sync time estimation has elapsed since the detected occurrence of the update, output the sync notification on the presenter device to indicate when the shared screen view of the presenter device has been delivered to the audience;
wherein, prior to outputting the sync notification, the presenter device displays a progress indicator that indicates a current portion of the sync time estimation that has expired since the update was detected; and
wherein outputting the sync notification on the presenter device includes:
in response to expiration of the sync time estimation, no longer displaying the progress indicator that indicates the current portion of the sync time estimation that has expired on the presenter device and displaying the sync notification in place of the progress indicator.

17. A computer program product as in claim 16 wherein the set of instructions, when carried out by computerized circuitry, further causes the computerized circuitry to:
(i) after detecting the occurrence of the update to the shared screen view of the presenter device and (ii) while waiting for the sync time estimation to elapse, render the progress indicator on the presenter device to display progress in delivery of the shared screen view to the audience.

18. A computer program product as in claim 17 wherein the computerized circuitry, when generating the sync time estimation, is constructed and arranged to:
obtain a collection of time delay measurements, each time delay measurement identifying a time delay in delivering a particular shared screen view to a particular audience device, and
derive the sync time estimation based on the collection of time delay measurements.

19. Electronic circuitry to provide a sync notification to indicate when a shared screen view of a presenter device has been delivered to an audience, comprising:
a network interface;
memory; and
control circuitry coupled to the network interface and the memory, the memory storing instructions which, when carried out by the control circuitry, cause the control circuitry to:
generate a sync time estimation based on communications with a set of audience devices,
detect occurrence of an update to the shared screen view of the presenter device, and
after the sync time estimation has elapsed since the detected occurrence of the update, output the sync notification on the presenter device to indicate when the shared screen view of the presenter device has been delivered to the audience;
wherein, prior to outputting the sync notification, the presenter device displays a progress indicator that indicates a current portion of the sync time estimation that has expired since the update was detected; and
wherein the control circuitry, when outputting the sync notification on the presenter device, is constructed and arranged to:
in response to expiration of the sync time estimation, no longer display the progress indicator that indicates the current portion of the sync time estimation that has expired on the presenter device and display the sync notification in place of the progress indicator.

20. A method as in claim 1, further comprising:
generating another sync time estimation based on other communications with the set of audience devices;
detecting occurrence of another update to the shared screen view of the presenter device; and
after the other sync time estimation has elapsed since the detected occurrence of the other update, outputting another sync notification on the presenter device to indicate when the other update to the shared screen view of the presenter device has been delivered to the audience.

21. A computer program product as in claim 16 wherein the set of instructions, when carried out by computerized circuitry, further causes the computerized circuitry to:
generate another sync time estimation based on other communications with the set of audience devices;
detect occurrence of another update to the shared screen view of the presenter device; and
after the other sync time estimation has elapsed since the detected occurrence of the other update, output another sync notification on the presenter device to indicate when the other update to the shared screen view of the presenter device has been delivered to the audience.

22. Electronic circuitry as in claim 19 wherein the control circuitry is further constructed and arranged to:

generate another sync time estimation based on other communications with the set of audience devices;

detect occurrence of another update to the shared screen view of the presenter device; and after the other sync time estimation has elapsed since the detected occurrence of the other update, output another sync notification on the presenter device to indicate when the other update to the shared screen view of the presenter device has been delivered to the audience.

* * * * *